United States Patent [19]
Schef

[11] Patent Number: 6,082,378
[45] Date of Patent: Jul. 4, 2000

[54] METHOD AND APPARATUS FOR INTERNAL CLEANING OF PIPES OR TUBES

[76] Inventor: Eddie Schef, Badhusgatan 9, S-774 31 Avesta, Sweden

[21] Appl. No.: 09/104,335

[22] Filed: Jun. 25, 1998

[30] Foreign Application Priority Data

Feb. 27, 1998 [SE] Sweden ............................. 98 00621-6

[51] Int. Cl.$^7$ .................................................. B08B 9/04
[52] U.S. Cl. .............................. 134/8; 15/3.5; 15/104.062
[58] Field of Search ....................... 134/8, 22.11, 22.12; 15/3.5, 3.51, 104.061, 104.062

[56] References Cited

U.S. PATENT DOCUMENTS

| 2,623,226 | 12/1952 | Jones et al. ........................... | 15/104.06 |
|---|---|---|---|
| 3,283,354 | 11/1966 | Simmons .............................. | 15/104.06 |
| 3,983,594 | 10/1976 | Simonelli .............................. | 15/104.06 |
| 4,016,621 | 4/1977 | Slegers et al. ........................ | 15/104.06 |
| 4,050,955 | 9/1977 | Southgate ..................................... | 134/8 |
| 4,724,007 | 2/1988 | Barry et al. ................................. | 134/1 |
| 5,103,524 | 4/1992 | Vowles ..................................... | 15/3.51 |
| 5,170,524 | 12/1992 | Vowles ..................................... | 15/3.51 |
| 5,277,248 | 1/1994 | Breland ..................................... | 166/70 |
| 5,640,734 | 6/1997 | Kuwashima ................................. | 15/3.5 |

FOREIGN PATENT DOCUMENTS 2406860  8/1975  Germany .

Primary Examiner—Randy Gulakowski
Assistant Examiner—Saeed Chaudhry
Attorney, Agent, or Firm—Young & Thompson

[57] ABSTRACT

The invention relates to a method for internal cleaning of pipes or tubes by inserting and propelling a projectile into and through respectively said pipe or tube by means of pressurized fluid, whereby the projectiles are fed one by one, in a direction generally transversal in relation to a firing direction, through an open side (16) of a housing (8) to a chamber (15) of the housing (8), whereupon a pressurized fluid source (50) is brought into communication with the chamber for discharging the projectile from the chamber (15) and for inserting the same into said tube or pipe through a nozzle, whereby the invention is characterized in that when a projectile has been fed into the chamber (15) the housing (8) is pivoted from a loading position to a firing position for bringing its open side (16) into alignment with the nozzle and thereby to coincide with the firing direction.

12 Claims, 4 Drawing Sheets

METHOD AND APPARATUS FOR INTERNAL CLEANING OF PIPES OR TUBES

FIELD OF INVENTION

The present invention relates to a method and an apparatus for internal cleaning of pipes or tubes by means of a projectile driven by pressurized fluid, and of the kind indicated in the preambles of claims 1 and 5 respectively.

PRIOR ART

Traditionally, when internally cleaning pipes and tubes within different fields, both relating to the cleaning of pipes or tubes that have been in operation and to the cleaning of newly manufactured pipes or tubes, mainly hand operated guns operated by compressed air have been employed for thrusting compressible projectiles through the pipe or tube. The projectiles thereby have an outer diameter exceeding the inner diameter of the pipe or tube such that its circumferential surface by force engages the inner surface of the pipe or tube and cleans the latter during the movement of the projectile through the pipe or tube. This is a principle which has been employed within many fields and which has provided good results during the most recent years.

In spite of the fact that portable guns have functioned well they are, especially in certain applications, conceived as being limited in the sense that they require manual feeding of each projectile into the gun. Handling the gun is therefore relatively burdensome and time consuming and not very effective. For the above reason there is a need within this technical field for equipment having a higher degree of automation for increased effectiveness and economy. This need specifically exists by the manufacture of new pipes and tubes where relatively large volumes thereof must be cleaned, and as an example could be mentioned pipes and tubes that are used for brake lines, fuel lines and so forth within the motor vehicle industry. Attempts have been made within this field to develop equipment satisfying such needs, but so far the produced machines have been very large and unhandy as well as heavy, and at the same time they have been very sensitive to disturbance. These limitations have practically in all cases had their cause in the automatic in-feed and firing or discharge of the projectiles, which for instance have been based on the same principles as those employed when loading a gun, i.e. a projectile has from one side been fed into a firing chamber that has been linearly moved to a firing position, whereupon the pressurized air intermittently has been introduced into the chamber for propelling the projectile through a nozzle and into the tube or pipe.

SUMMARY OF THE INVENTION

The basic object of the present invention is therefore to provide a method and an apparatus of the kind indicated in the introduction, for internal cleaning of pipes or tubes, which are especially suitable for an automated operation and thereby eliminate the above mentioned short-comings of the prior art.

The above indicated, basic object of the present invention is achieved by means of a method and an apparatus of the kind indicated in the introduction, which comprise the characteristic features according to patent claims 1 and 5 respectively.

Further developments of the basic inventive idea are stated in the dependent subclaims.

BRIEF DESCRIPTION OF THE DRAWINGS

Further features and advantages of the invention are made more clear in the following description of a presently preferred embodiment thereof, which is described and explained for the purpose of exemplifying the invention and which is illustrated in the enclosed, partially schematic drawings. In the drawings.

PREFERRED EMBODIMENTS

Figure 2:
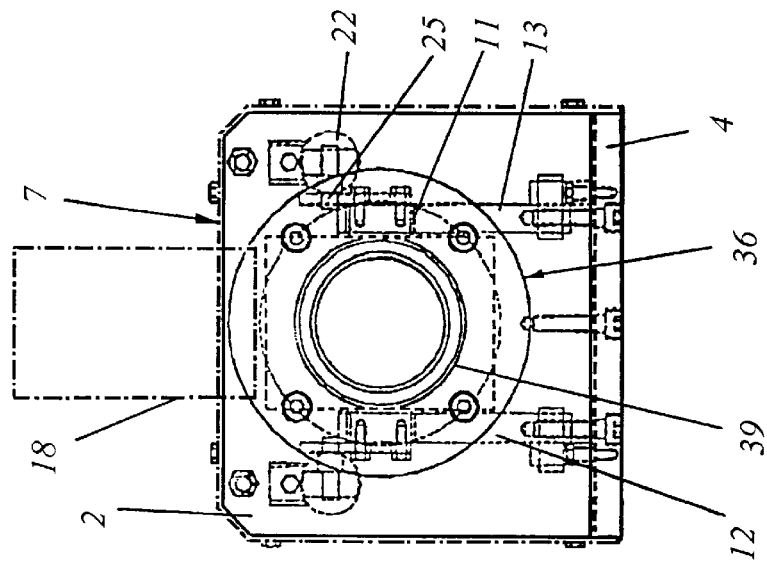
FIG. 2 shows an end view of the apparatus according to FIG. 1, as seen from the discharge side.

An exemplifying embodiment of an apparatus according to the invention, for internal cleaning of pipes or tubes by means of projectiles propelled by means of pressurized fluid, preferably pressurized air, shall now be described more closely with reference initially to FIGS. 1 and 2. The apparatus 1 comprises a frame 1 consisting of end plates 2 and 3 at each end of a bottom plate 4. The end plates 2 and 3 are adjacent their upper ends interconnected by means of connecting rods 5, 6, of which only one is shown in FIG. 1. Apart from completing the frame the connecting rods 5, 6 have the purpose of taking up the forces from the sealing process described more closely below. The complete frame and thereby the complete apparatus according to the invention is preferably enclosed in a casing 7 which in FIG. 1 is indicated by means of a dash dotted line and which is preferably provided with a removable, not specifically illustrated cover that may be removed for service and repair work. In a manner known in itself the cover is thereby preferably provided with a safety valve, not illustrated, excluding activation of the apparatus when the cover is removed.

A part that is of central importance with respect to the method as well as to the apparatus according to the invention, is a housing 8 which by means of shaft journals 9 and 10 (see especially FIG. 4) is pivotally journalled in the frame 1. For this purpose the shaft journals 9, 10 are rotatably supported in corresponding bores 11 provided in the upper ends of support arms 12, 13 which, with their lower ends are "floatingly" supported in the frame 1. This floating support is achieved by means of a resilient spring member 14, for instance manufactured from a rubber material, positioned between the lower ends of the support arms 12, 13 and the frame The housing 8 has the general shape of a ball that is chamfered at opposite sides for forming flat surfaces 8a and 8b and that is provided with a spherical outer circumferential surface 8c, the importance of which will be described more closely below. In the housing there is moreover provided a chamber 15, which has a substantially closed bottom 17 and one end or mouth 16 that is open at the spherical surface 8c. Through said open end the projectiles, which are of the conventional type that is well known within this technique and which are therefore not illustrated in the drawings, are "loaded", i.e. fed into the housing in a manner more closely described below. The projectiles are "loaded" into the housing through an in-feed apparatus 18, indicated in FIG. 1 by means of dash dotted lines, and are then "fired", i.e. introduced into and propelled through the pipe or tube to be cleaned. A number of supply channels 19 for pressurized air open into the bottom 17 of the chamber 15, said channels in their other end being open at the spherical surface 8c. In the illustrated embodiment there are five supply channels 19, as is clear especially from FIG. 4, and said supply channels are distributed such that one of them coincides with a symmetry line through the housing, whereas the remaining four are provided on a circle having the symmetry line as its centre. It should be emphasized that within the basic principles of the invention the channels 19 may be provided or distributed in alternative manners and that the invention is therefore not delimited by the number of channels, their distribution or direction.

Figure 4:
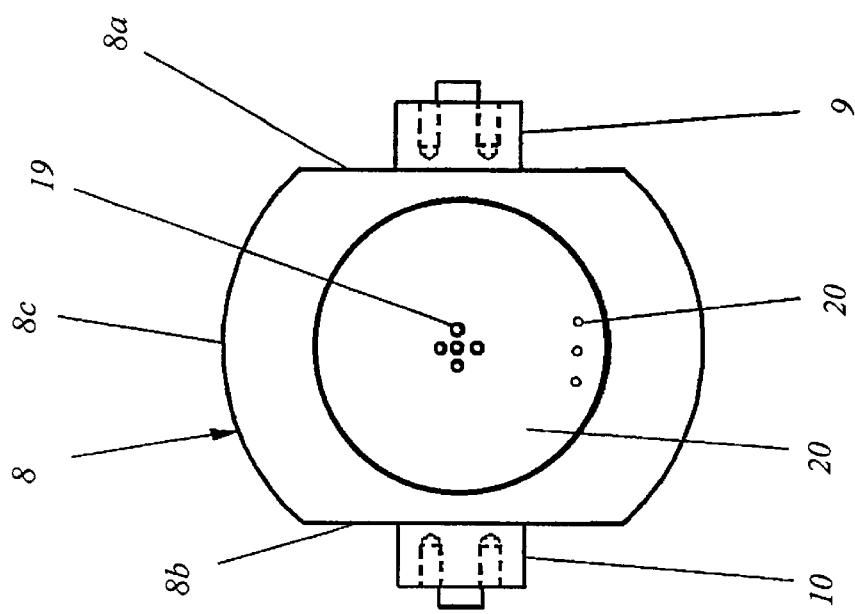
FIG. 4 shows a view from above of the housing with its inner chamber.
Figure 3:
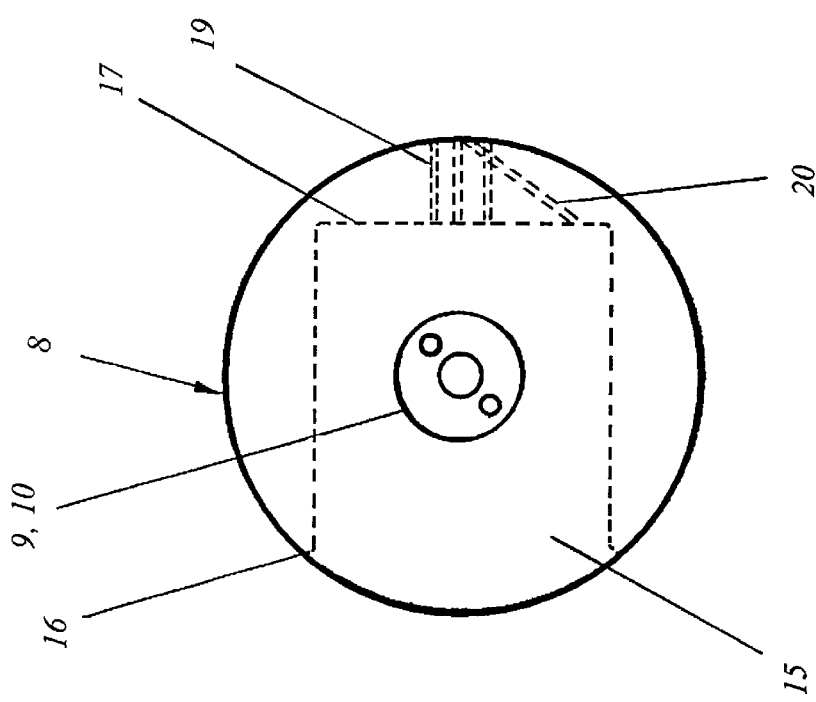
FIG. 3 shows a side view of a loading and firing housing of the apparatus according to FIGS. 1 and 2, illustrated in a firing position.

Furthermore, it is indicated in FIGS. 3 and 4 that further auxiliary channels 20 may be provided, and as will be described further below the purpose of said auxiliary channels 20 is to support blowing especially smaller projectiles into the tube or pipe. These auxiliary channels 20 are in this embodiment illustrated in the shape of three channels provided such that they open into the chamber 15 substantially in line with each other adjacent the lower, in the firing position, sidewall of the chamber 15, but different modifications are possible within the scope of the invention, both regarding the number of the auxiliary channels 20 and their position.

Figure 1A:
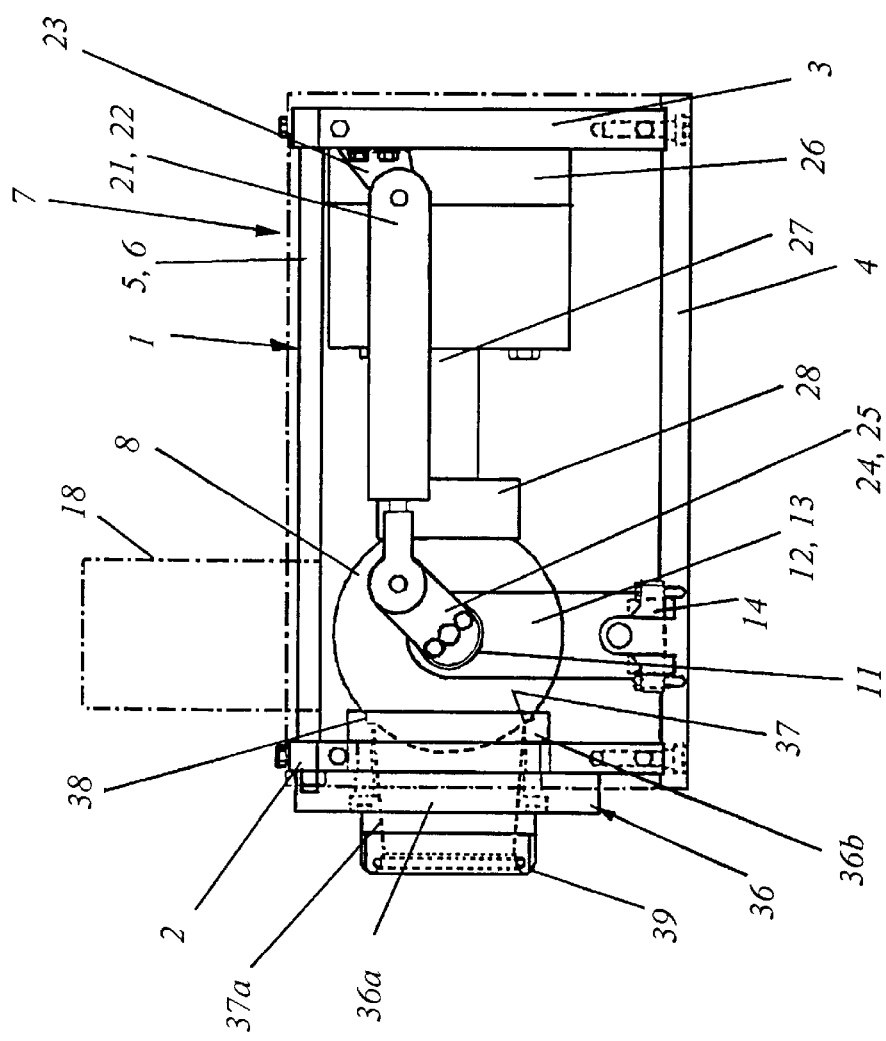
FIG. 1a shows a plan view from one side of an embodiment of an apparatus according to the invention.

In the illustrated embodiment the pivoting of the housing 8 is achieved by means of pneumatic cylinders 21, 22 (only one is illustrated in FIG. 1a, but in practice, for reasons of stability, one cylinder is required for each journal 9 and 10 respectively of the housing 8) which at their rear end are pivotally connected to a bracket 23 attached to the rear end plate 3 of the frame. At their piston rod end the pneumatic cylinders 21, 22 are furthermore each pivotally connected to a link 24, 25 of which likewise only one 24 is illustrated in FIG. 1a, and which at their other end are firmly connected to the respective shaft journal 9, 10 of the housing 8. The pneumatic cylinders 21, 22 are thereby dimensioned such that their stroke length permits pivoting of the housing 8 by substantially 90° around the shaft journals 9, 10.

Although pneumatic cylinders 21, 22 are employed in the illustrated embodiment, it should be obvious that these may be replaced by pneumatic or for instance electrical rotary actuators that are known in themselves and that are attached to the respective support arm 12, 13, engaging the respective shaft journal 9, 10 for pivoting the housing 8.

To the inner side of the rear plate 3 of the frame 1 a force applicating means is furthermore attached, having the shape of a diaphragm type cylinder 29, the piston rod 27 of which at its forward or outer end carries a sealing box 28 intended to engage the spherical surface 8c of the housing 8 with its outer surface.

Figure 1B:
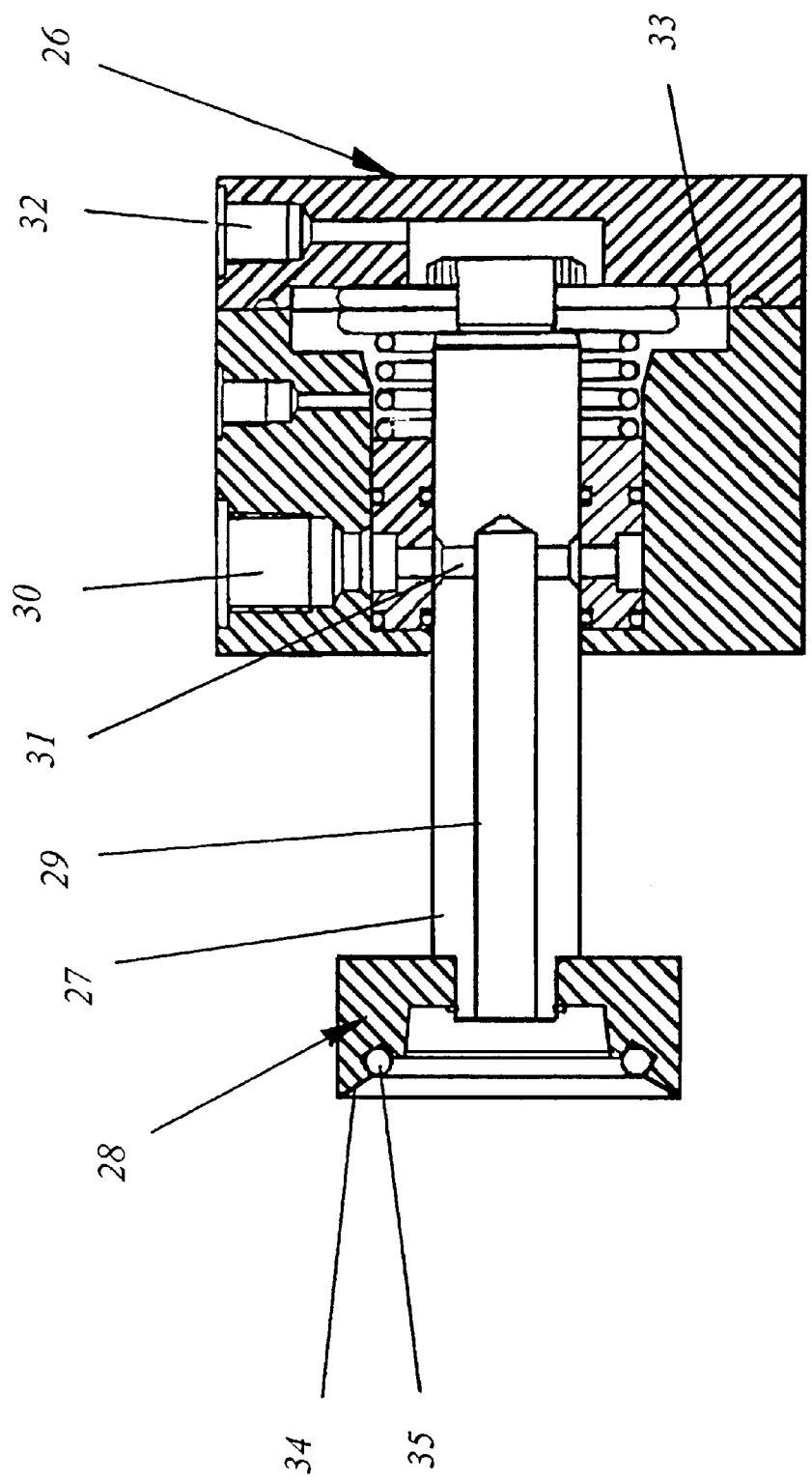
FIG. 1b shows a longitudinal section through a diaphragm type cylinder of the apparatus according to FIG. 1.

As is clear from the sectional view of FIG. 1b the piston rod 27 of the diaphragm type cylinder is provided with a dead end hole 29 opening into the sealing box 28 and communicating with a compressed air connection 31 provided in the housing of the diaphragm type cylinder through connecting channels 30, said compressed air connection being intended for blow air, i.e. air for "firing" and propelling the projectile through the pipe or tube to be cleaned. Furthermore the diaphragm type cylinder 26 is provided with an control air connection 32 through which compressed air is introduced below the diaphragm 33 for extending the piston rod such that the sealing box 28 with force engages the housing 8 in the sequence described more closely below. In order to provide a sealing engagement of the sealing box 28 against the housing 8 with respect to the blow air, the sealing box, at its side facing the housing 8, is provided with a spherical or conical recess 34 being adapted to the spherical surface 8c of the housing 8. In the wall of the recess 34 a groove is provided and in said groove an O-ring 35 is provided. Other details of the diaphragm type cylinder 26 are not described in detail herein since it is quite conventionally designed in other respects.

At the forward end plate 2 of the frame an outlet box 36 is attached by means of a securing flange 36a contacting the outer side of the end plate 2 and having a tubular connecting piece 36b projecting through an aperture, not illustrated in detail, of the end plate 2. At its inner end, facing the housing 8, the connecting piece 36b is provided with a spherical recess 37 having an O-ring 38 provided in a groove in the spherical surface, said O-ring serving the purpose of sealing against the spherical surface 8c of the housing 8. The spherical recess 37 continues in a tapering channel 37a inside the outlet box 36, said channel 37a opening into a nozzle attachment 39 attached to the outer side of the outlet box, said nozzle attachment being intended to receive a nozzle having a conventional shape but not being illustrated in detail herein, i.e. a nozzle essentially corresponding to the type of nozzle being employed together with the previously known, above mentioned portable guns. The nozzle is employed in a conventional manner for compressing the projectile for insertion into the pipe or tube to be cleaned.

Figure 5:
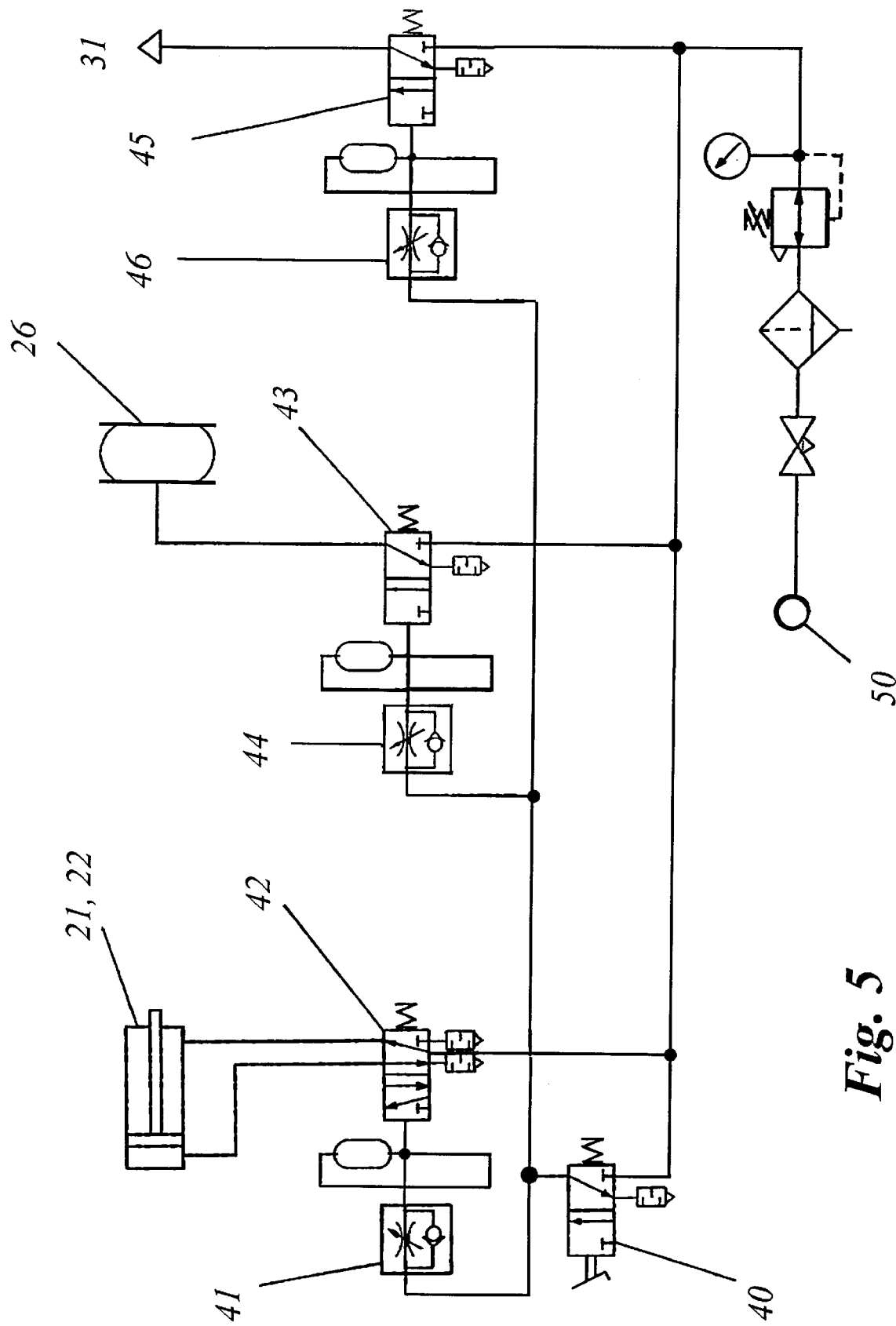
FIG. 5 shows an embodiment of a pneumatic coupling diagram for controlling the equipment according to the invention.

Drawing FIG. 5 illustrates a pneumatic coupling diagram for one embodiment of a controlling equipment, the purpose of which is to control the operating sequence of the above described apparatus, and with reference to said FIG. 5 and specifically also to FIGS. 1a and 1b the operation or function achieved by means of the invention shall now be described. In the starting position the housing 8 is in a "loading" or in-feed position with the opening 16 of the chamber 15 being directed straight upwardly in FIG. 1a, whereby it is ready for receiving a projectile, said projectiles being supplied one by one through the in-feed tube 18. Although the invention may be employed together with many different types of feeding apparatuses it shall in this connection be emphasized that the in-feed tube 18 advantageously may be designed having an inner diameter substantially corresponding to that of the chamber 15 of the housing 8, i.e. substantially corresponding to the largest diameter of the projectile that may be employed together with the apparatus according to the invention. However, according to the principles of the invention the specific advantage is achieved that with one and the same size of the housing and chamber it is possible to efficiently utilize projectiles having a size from this maximum diameter, which may be in the order of 135 mm, and down to a diameter of a few millimeters. The only adjustment that is required is that at its outlet the nozzle must be adapted to the diameter of the projectile for providing the necessary compression of the projectile for its insertion into the pipe or tube.

With the projectile inserted into the chamber 15 the starting valve 40 is operated, said valve for instance being operated by means of a foot-pedal, whereby the valve 40 is displaced to the right in FIG. 5 and connects a compressed air source 50 to a pilot control line of a first operating valve 42 for the pneumatic cylinders 21, 22 through an adjustable flow restrictor valve 41. In the opposite direction said valve functions to restrict the backward flow from the pilot control line of the valve 42. When the pneumatic cylinders 21, 22 are actuated the housing 8 is pivoted approximately 90° by the links 24, 25, such that the opening 16 of the chamber 15 is positioned facing the connecting piece 36b of the outlet box 36 and such that the openings of the supply channels 19, 20, which are positioned in the spherical surface 8c, face the sealing box 28. The actuation of the starting valve 40 also connects a pilot control line of a second operating valve 43 for operating the diaphragm type cylinder 26, with the compressed air source 50 through a second flow restrictor valve 44 which in this direction of flow functions to delay the action of the diaphragm type cylinder 26 until pivoting of the housing 8 is completed, and this is secured by setting a first time delay at the flow restrictor valve 44.

The operation of the diaphragm type cylinder 26 in turn causes the sealing box 28 being attached to the piston rod 27 of the diaphragm type cylinder 26, to sealingly engage, through the O-ring 35, the spherical surface 8c of the housing, such that the compressed air may be introduced into the chamber 15 without leakage. By virtue of the floating support of the housing in the support arms 12, 13, through the resilient spring members 14, the application of the force by means of the diaphragm type cylinder 26 also causes the housing 8 to move to the left in FIG. 1a, such that its spherical surface 8c is also brought into sealing engagement with the connecting piece 36b of the outlet box 36 through its O-ring 38. Hereby a sealed connection is secured for compressed air, from the compressed air connection 31 to the nozzle attachment 39.

Finally, the operation of the starting valve 40 causes compressed air to be supplied, through a third adjustable flow restrictor valve 46, to a third operating valve 45 for blow-air, by means of which the projectile is to be inserted into and propelled through the pipe or tube. In this case the adjustable flow restrictor valve is employed for setting a second time delay before the operating valve 45 for the blow-air opens, i.e. a time sufficient for completing the above described sealing through the action of the diaphragm type cylinder 26.

As the blow-air is abruptly applied the projectile positioned in the chamber 15 is caused to move very rapidly to the left in FIG. 1 a and out to the nozzle, not illustrated, where it is compressed for insertion into the pipe or tube. In this connection it should also be emphasized that the auxiliary channels 20, described more closely above, open adjacent the area of the insertion chamber 15 being the lower area thereof, in the firing or insertion position, and the reason for this is to secure an appropriate discharge also of projectiles having a smaller diameter, which, as mentioned above, may be as small as a few millimeters.

After "firing" the projectile the foot-pedal is released, whereby the operating valves 43 and 45 are immediately changed-over to shut off the blow-air and to initiate the return stroke of the diaphragm cylinder 26 (in the illustrated embodiment by means of a spring return). In view of the fact that the first flow restrictor valve 41 for the operating valve 42 is active in the opposite direction the pivoting back of the housing 8 by means of the—in the illustrated embodiment double-acting—pneumatic cylinders 21, 22 is likewise performed with a third time delay after the return stroke of the diaphragm type cylinder 26. The intention thereof is naturally, like with the delay of the operating stroke of the diaphragm type cylinder 26, that the pivoting of the housing 8 shall be performed without any load from the diaphragm type cylinder. When the housing 8 has been turned back approximately 90° the apparatus is once more ready for loading a new projectile.

In view of the above it is now appreciated that with the principles of the invention described above the objects set out in the introduction are well achieved, namely that by feeding the projectiles into the housing in a direction perpendicular to the firing or insertion direction and then pivoting the housing for aligning the chamber in said firing or insertion direction a very compact and light-weight design is achieved which is well suited for automation by permitting simple supply and in-feed of the projectiles. By means of the "floating" support of the housing in combination with the application of the force of the diaphragm type cylinder for sealing the inlet as well as the outlet of the housing the design may be further optimized with regard to compactness and simplicity.

Although the invention has been described above with specific reference to a presently preferred embodiment thereof, it should be obvious that the invention is not restricted thereto but also comprises variations and modifications that are obvious to a man skilled in the art. Thus, it is for instance conceivable to design the supply of blow-air otherwise, such as separated from the diaphragm type cylinder, by means of any type of conventional rotary coupling. The scope of the invention shall therefore only be delimited by the enclosed patent claims.

What is claimed is:

1. A method for internal cleaning of a pipe or tube by inserting a projectile into and propelling said projectile through said pipe or tube by means of pressurized fluid, whereby projectiles are fed one by one, in a direction generally transversal in relation to a firing direction, through an open side (16) of a housing (8) and into a chamber (15) in said housing (8), whereupon a pressurized fluid source (50) is brought into communication with the chamber for ejecting the projectile from the chamber (15) and for inserting the same into said pipe or tube through a nozzle, and whereby the housing (8), when a projectile has been fed into the chamber (15), is pivoted from a loading position to a firing position for bringing its open side (16) in line with the nozzle and thereby to coincide with the firing direction, comprising the steps of:

floatingly supporting the housing (8);

pivoting the housing (8) to the firing position; and applying a force by a force applicator (26) to the housing (8) in the firing direction for sealing the inlet (19,20) and outlet (16) of the housing (8).

2. The method according to claim 1, wherein the application of the force against the housing (8) is performed with a time delay after pivoting the housing from the loading position to the firing position, in that the pressurize fluid source (50) is brought into communication with the chamber of the housing (8) with a second time delay after said pivoting of the housing (8), whereby the second time delay is longer than the first time delay, in that subsequent to the insertion of the projectile into the pipe or tube to be cleaned, the communication with the pressurized fluid source is disconnected and the force against the housing (8) is relieved, and in that the housing (8) is then, with a third time delay pivoted back to the in-feed position for feeding in a new projectile.

3. The method according to claim 1 wherein the pressurized fluid is supplied to the housing (8) through several supply channels (19,20) which, separated from each other open in a bottom (17) of the insertion chamber (15).

4. The method according to claim 2 wherein the pressurized fluid is supplied to the housing (8) through several supply channels (19,20) which, separated from each other open in a bottom (17) of the insertion chamber (15).

5. An apparatus for internal cleaning of a pipe or tube by inserting a projectile into and propelling the same through said pipe or tube by means of pressurized fluid, comprising a housing (8) supported in a frame (1) and having a chamber (15) formed therein which is provided with an open end (16) and which is adapted to be brought into communication with a pressurized fluid source (50) through fluid connections (19,20), the housing (8) being pivotally mounted in the frame so as to be pivoted between a loading position with the open end (16) of the chamber (15) directed substantially transversal in relation to a firing direction of the projectile, and a firing position with the open end (16) of the chamber (15) directed substantially in the firing direction, and wherein the housing (8) is floatingly supported in the frame (1) and by a force applicator (26) for applying a force to the housing (8) substantially in alignment with the firing direction, for sealing the outlet from and/or the inlet to the chamber (15).

6. The apparatus according to claim 5, wherein the housing (8) has a spherical surface (8c) in which the outlet 16 and inlet 19,20 of the chamber open, in that the frame (1) at a front end plate (2) thereof is provided with an outlet box (36) having a through bore (37a) and a recess (37) facing the housing and having a spherical surface with a sealing member (38) provided therein for sealing against the spherical surface (8c) of the housing (8), surrounding the open end (16) of the chamber (15), when the force is applied in the firing direction and with the housing (8) pivoted to the firing position.

7. The apparatus according to claim 6 wherein the force applicator (26) comprises a pneumatic cylinder having a piston rod (27) at the free end of which is provided a sealing box (28) which, at its side facing the spherical surface (8c) of the housing (8), is provided with a tapered or spherical recess (34) having a seal member (35) provided therein, for sealing against the spherical surface (8c) of the housing (8), surrounding the openings of the inlet (19,20) at the spherical surface (8c), when the force is applied in the firing direction and with the housing (8) is in the firing position.

8. The apparatus according to claim 7 wherein the recess (34) in the sealing box (28) communicates with a pressurized fluid connection (31) in the housing of the cylinder (26) through an inner channel (29) in the piston rod (27) of the cylinder (26).

9. The apparatus according to claim 8, wherein pressurized fluid is supplied to the apparatus from the pressurized fluid source (50) through a starting valve (40) which in its actuated position feeds pressurized fluid to at least one rotary actuator (21,22) for pivoting the housing (8) from the loading position to the firing position, to the force applicator (26) and to the chamber (15) of the housing (8), whereby the pressurize fluid feed to the force applicator (26) is controlled through an adjustable second time delay valve (44) for setting a first time delay, the pressurized fluid feed to the chamber (15) is performed controlled through a third adjustable time delay valve (46) for setting a second time delay and in that the supply of the force applicator (26) and the pressurized air supply to the chamber (15) is shut off when the starting valve (40) is released and in that the return movement of the rotary actuator (21,22), for pivoting the housing (8) back to the loading position, is controlled with a time delay by a first adjustable time delay valve (41) for setting a third time delay.

10. The apparatus according to claim 7, wherein pressurized fluid is supplied to the apparatus from the pressurized fluid source (50) through a starting valve (40) which in its actuated position feeds pressurized fluid to at least one rotary actuator (21,22) for pivoting the housing (8) from the loading position to the firing position, to the force applicator (26) and to the chamber (15) of the housing (8), whereby the pressurize fluid feed to the force applicator (26) is controlled through an adjustable second time delay valve (44) for setting a first time delay, the pressurized fluid feed to the chamber (15) is performed controlled through a third adjustable time delay valve (46) for setting a second time delay and in that the supply of the force applicator (26) and the pressurized air supply to the chamber (15) is shut off when the starting valve (40) is released and in that the return movement of the rotary actuator (21,22), for pivoting the housing (8) back to the loading position, is controlled with a time delay by a first adjustable time delay valve (41) for setting a third time delay.

11. The apparatus according to claim 5, wherein pressurized fluid is supplied to the apparatus from the pressurized fluid source (50) through a starting valve (40) which in its actuated position feeds pressurized fluid to at least one rotary actuator (21,22) for pivoting the housing (8) from the loading position to the firing position, to the force applicator (26) and to the chamber (15) of the housing (8), whereby the pressurize fluid feed to the force applicator (26) is controlled through an adjustable second time delay valve (44) for setting a first time delay, the pressurized fluid feed to the chamber (15) is performed controlled through a third adjustable time delay valve (46) for setting a second time delay and in that the supply of the force applicator (26) and the pressurized air supply to the chamber (15) is shut off when the starting valve (40) is released and in that the return movement of the rotary actuator (21,22), for pivoting the housing (8) back to the loading position, is controlled with a time delay by a first adjustable time delay valve (41) for setting a third time delay.

12. The apparatus according to claim 6, wherein pressurized fluid is supplied to the apparatus from the pressurized fluid source (50) through a starting valve (40) which in its actuated position feeds pressurized fluid to at least one rotary actuator (21,22) for pivoting the housing (8) from the loading position to the firing position, to the force applicator (26) and to the chamber (15) of the housing (8), whereby the pressurize fluid feed to the force applicator (26) is controlled through an adjustable second time delay valve (44) for setting a first time delay, the pressurized fluid feed to the chamber (15) is performed controlled through a third adjustable time delay valve (46) for setting a second time delay and in that the supply of the force applicator (26) and the pressurized air supply to the chamber (15) is shut off when the starting valve (40) is released and in that the return movement of the rotary actuator (21,22), for pivoting the housing (8) back to the loading position, is controlled with a time delay by a first adjustable time delay valve (41) for setting a third time delay.

* * * * *